(12) United States Patent
Smithers et al.

(10) Patent No.: US 12,208,922 B2
(45) Date of Patent: Jan. 28, 2025

(54) CHANGING BUOYANCY BASED ON COMBINING A LIQUID WITH A SUBSTRATE

(71) Applicant: Boston Engineering Corporation, Waltham, MA (US)

(72) Inventors: Mark W. Smithers, Framingham, MA (US); David Alfred Simm, Westfield, MA (US); Katherine Conner, Boston, MA (US)

(73) Assignee: Boston Engineering Corporation, Waltham, MA (US)

( * ) Notice: Subject to any disclaimer, the term of this patent is extended or adjusted under 35 U.S.C. 154(b) by 595 days.

(21) Appl. No.: 17/006,465

(22) Filed: Aug. 28, 2020

(65) Prior Publication Data

US 2021/0061488 A1 Mar. 4, 2021

Related U.S. Application Data

(60) Provisional application No. 62/894,081, filed on Aug. 30, 2019.

(51) Int. Cl.
*B64F 3/02* (2006.01)
*B01J 7/00* (2006.01)
(Continued)

(52) U.S. Cl.
CPC ...... *B64F 3/02* (2013.01); *B01J 7/00* (2013.01); *B64B 1/44* (2013.01); *C01B 3/00* (2013.01);
(Continued)

(58) Field of Classification Search
CPC .............. C01B 3/08; C01B 2203/0495; C01B 2203/066; C01B 25/45; C01B 3/00;
(Continued)

(56) References Cited

U.S. PATENT DOCUMENTS 3,657,752 A * 4/1972 Davidson ................. B64B 1/62
116/210
4,084,375 A 4/1978 Horvath
(Continued)

FOREIGN PATENT DOCUMENTS

CN 106394855 2/2017

OTHER PUBLICATIONS

Nicholas B. Pulsone, Douglas P. Hart, Andrew M. Siegel, Joseph R. Edwards, and Kristen E. Railey (2017), Aluminum-Water Energy System for Autonomous Undersea Vehicles, Lincoln Laboratory Journal n vol. 22, No. 2, pp. 79-90.
(Continued)

*Primary Examiner* — Wayne A Langel
*Assistant Examiner* — Syed T Iqbal
(74) *Attorney, Agent, or Firm* — BainwoodHuang (57) ABSTRACT

A technique for varying buoyancy of an apparatus includes providing a substrate configured to produce gas on demand when exposed to a liquid, exposing the substrate to such liquid, and capturing the gas produced by the substrate to increase the buoyancy of the apparatus within a fluid. In some examples, the liquid and the fluid contain the same material, such that gas may be produced using fluid already in the environment.

16 Claims, 7 Drawing Sheets

(51) Int. Cl.
  *B64B 1/44*  (2006.01)
  *B64B 1/50*  (2006.01)
  *B64D 31/06*  (2024.01)
  *B64U 10/30*  (2023.01)
  *B64U 50/00*  (2023.01)
  *B64U 50/34*  (2023.01)
  *C01B 3/00*  (2006.01)
  *C01B 3/06*  (2006.01)
  *C01B 3/08*  (2006.01)

(52) U.S. Cl.
  CPC .................. *C01B 3/06* (2013.01); *C01B 3/08* (2013.01); *B64B 1/50* (2013.01); *B64D 31/06* (2013.01); *B64U 10/30* (2023.01); *B64U 50/34* (2023.01)

(58) Field of Classification Search
  CPC .................. C01B 3/10; C01B 2203/02; C01B 2203/0233; C01B 2203/0816; C01B 2203/1604; C01B 2203/1647; C01B 3/06; C01B 3/065; C01B 3/384
  See application file for complete search history.

(56) References Cited

U.S. PATENT DOCUMENTS

| | | |
|---|---|---|
| 5,867,978 A | 2/1999 | Klanchar et al. |
| 8,100,074 B2 | 1/2012 | Cameron et al. |
| 8,689,714 B1 | 4/2014 | Ramotowski |
| 2004/0205997 A1* | 10/2004 | Youngblood .............. B01J 7/02 48/89 |
| 2005/0014499 A1* | 1/2005 | Knoblach .............. G05D 1/042 455/13.1 |
| 2014/0284422 A1* | 9/2014 | Sapir ........................ B64B 1/40 244/96 |

OTHER PUBLICATIONS

U.S. Department of Energy (2008), Reaction of Aluminum with Water to Produce Hydrogen: A Study of Issues Related to the Use of Aluminum for On-Board Vehicular Hydrogen Storage.

Ling-Hsiang Chen (Fall, 2015), Aluminum Hydrogen Fuel Cell, submitted as coursework for PH240, Stanford University.

* cited by examiner

CHANGING BUOYANCY BASED ON COMBINING A LIQUID WITH A SUBSTRATE

CROSS-REFERENCE TO RELATED APPLICATIONS

This application claims the benefit of U.S. Provisional Application No. 62/894,081, filed Aug. 30, 2019, the contents and teachings of which are incorporated herein by reference in their entirety.

BACKGROUND

Changing the buoyancy of an apparatus within a fluid, such as water or air, has long been a necessary activity in many areas, such as maritime and aviation technologies. Submarines, air balloons, dirigibles, and the like use ballasts, hot air, compressed gas, hydrogen, and/or helium to vary altitude in the atmosphere or depth within water. For maritime uses, gases such as helium, hydrogen, and carbon dioxide may be stored in compressed form, e.g., in storage tanks or cartridges, and released to lower-pressure states as needed to increase buoyancy.

With some technologies, gases may be produced on demand rather than stored in compressed form. For example, hydrogen gas may be produced from water using electrolysis.

SUMMARY

Unfortunately, compressed gas tanks and cartridges can consume considerable space. They can also raise safety concerns, as pressurized containers can rupture. On-demand approaches such as electrolysis can require less space but require a great deal of power. Thus, conventional electrolysis has been a poor choice for battery-powered applications and those for which energy efficiency is a concern.

In contrast with prior approaches, a technique for varying buoyancy of an apparatus includes providing a substrate configured to produce gas on demand when exposed to a liquid, exposing the substrate to such liquid, and capturing the gas produced by the substrate to increase the buoyancy of the apparatus within a fluid. In some examples, the liquid and the fluid contain the same material, such that gas may be produced using fluid already in the environment. In some examples, the substrate produces the gas using a passive reaction, which proceeds spontaneously once the substrate is exposed to the liquid. Gas can thus be produced to vary buoyancy without the need for tanks of compressed gas or large power sources for supporting conventional electrolysis.

Certain embodiments are directed to a method of varying buoyancy. The method includes providing a substrate within an apparatus surrounded by fluid, the substrate configured to produce gas on demand when exposed to a liquid. The substrate initially is not exposed to the liquid. The method further includes exposing the substrate to the liquid, the substrate thereby producing gas, and capturing the gas produced by the substrate to increase buoyancy of the apparatus within the fluid.

Other embodiments are directed to an apparatus for use within a fluid. The apparatus includes a substrate configured to produce gas on demand when exposed to a liquid, a mixing assembly configured to controllably expose the substrate to the liquid, and a container in communication with the mixing assembly and configured to capture gas produced by the substrate in response to exposure of the substrate to the liquid. The gas captured by the container effects an increase in buoyancy of the apparatus within the fluid.

Further embodiments are directed to a method of changing elevation of at least a portion of an apparatus. The method includes executing a pre-programmed change elevation command and/or receiving, from remote equipment that is located remotely from the apparatus, a change elevation command to change elevation of a container of the apparatus while the container resides at a first elevation. In response to the change elevation command, the method further includes performing a mixing operation that mixes a liquid with a gas generating substrate to generate gas. The method still further includes inputting the generated gas into the container to change elevation of the container from the first elevation to a second elevation that is different from the first elevation.

Still further embodiments are directed to an apparatus that includes a container, control circuitry constructed and arranged to execute a pre-programmed change elevation command and/or receive, from remote equipment that is located remotely from the apparatus, a change elevation command to change elevation of the container while the container resides at a first elevation, and to provide a mixing signal in response to the change elevation command. The apparatus further includes a mixing assembly coupled with the container and the control circuitry, the mixing assembly being constructed and arranged to perform, in response to the mixing signal from the control circuitry, a mixing operation that mixes a liquid with a gas-generating substrate to generate gas and to input the generated gas into the container to change elevation of the container from the first elevation to a second elevation that is different from the first elevation.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

Embodiments of the improved technique will now be described. One should appreciate that such embodiments are provided by way of example to illustrate certain features and principles of the disclosure but are not intended to be limiting.

An improved technique for varying buoyancy of an apparatus includes providing a substrate configured to produce gas on demand when exposed to a liquid, exposing the substrate to such liquid, and capturing the gas produced by the substrate to increase the buoyancy of the apparatus within a fluid.

The substrate can be any material the produces gas when exposed to a liquid. For example, sodium bicarbonate when mixed with water and acid releases carbon dioxide gas. Other reactions are known to produce hydrogen sulfide or ammonia gas from solid or liquid reactants. In addition, bulk activated alumina is known to produce gas when exposed to water. The liquid can be any liquid which produces a gas when exposed to a substrate. Of particular interest for the instant application is a substrate composed at least partially of aluminum and a liquid composed at least partially of water. The fluid may have the same composition as the liquid or may be different. For example, both the fluid and the liquid may be water. Alternatively, the fluid may be air and the liquid may be water, for example.

One example of a substrate containing aluminum is a nanogalvanic structured aluminum particulate material. Such material is capable of generating hydrogen gas rapidly by hydrolysis reaction with water or any liquid that contains water. Examples of this material are described in U.S. Pat. No. 9,011,572, filed Apr. 21, 2015, the contents and teachings of which are incorporated herein by reference, and U.S. Patent Publication No. 2008/0056986, published Mar. 6, 2008, the contents and teachings of which are also incorporated herein by reference. The hydrolysis reaction may take place at room temperature and without chemicals, catalysts, or externally supplied power. With this kind of material, hydrogen gas may be produced on demand and without application of external power, merely by exposing the substrate to water or any material that contains water.

Although the above-mentioned nanogalvanic aluminum has been previously proposed in connection with power generation, e.g., by providing hydrogen gas to a fuel cell, the instant application documents the first known use of this or any other material for varying the buoyancy of an apparatus within a fluid.

In basic principle, embodiments of the invention provide a quantity of substrate, such as one that contains nanogalvanic aluminum, and a manner of exposing the substrate or portions thereof to liquid, such as a water-containing liquid, so as to generate a volume of gas that can be captured and contained, at least temporarily, to vary the buoyancy of an apparatus within a fluid. The fluid may be air, water, or any other fluid medium. The apparatus may be configured for airborne or underwater use, for example. For aircraft, a balloon or other container may capture the generated gas, which in the case of hydrogen causes the aircraft to ascend within the atmosphere. For underwater applications, a container may receive and contain the generated gas. The generated gas may act to displace water within the container (e.g., through holes/valves in the container), causing the container to become less dense and thus to become more buoyant. In some examples, the container includes an expandable portion, such as a balloon, bellows, bladder, or the like, which expands when filled with generated gas, displacing water around the expandable portion and increasing buoyancy. In some examples, the container includes an external portion attached to the apparatus but disposed outside a housing of the apparatus. When the external portion receives the generated gas, it increases the buoyancy of the apparatus as a whole, tending to pull the housing up within the water. Non-limiting examples of underwater apparatus include submarines, other submersible vehicles, sondes, and dropsondes.

In some examples, the substrate is provided in the form of a solid, such as a porous solid, powder, pellets, and/or beads. The substrate may be provided in multiple sealed compartments that contain respective portions of the substrate. Each compartment may have its own covering, and the coverings may be individually controllable to open on command. In this manner, gas may be generated in increments that allow for fine-grained control over the buoyancy of the apparatus.

Although the primary use herein of generated gas is to vary buoyancy, the gas may serve additional purposes for which there are additional benefits. For example, hydrogen gas created by exposing nanogalvanic aluminum to water may be captured and directed to a fuel cell or other power-generating equipment (e.g., engine, turbine, etc.) for generating electrical power. Such power may be used by the apparatus itself. For example, the power generated by the fuel cell may charge a battery that powers electronic circuitry within the apparatus. In this manner, generation of gas serves the dual purpose of varying buoyancy and generating power.

In some examples, the apparatus may direct the gas or some portion of the gas to a deployable balloon of the apparatus, such that the balloon inflates. The deployable balloon may be separate from the container, such that a first portion of the generated gas enters the container and a second portion of the generated gas inflates the deployable balloon. An antenna may be connected to the balloon and tethered to communication circuitry within the apparatus, e.g., via a cable. When the balloon is inflated and the apparatus is at least partially under water, the balloon may separate from the apparatus and float to the surface of the water. In some cases, the balloon may rise above the surface to an altitude limited by a length of the cable. The altitude may be sufficient to allow the apparatus to send and/or receive wireless communication signals (e.g., radio, satellite, GPS, etc.) over distances much longer than could be achieved if the antenna were in the water or sitting on the surface. In this manner, the balloon may initially be surrounded by a first fluid (e.g., water) and may rise above the surface and enter a second fluid (e.g., air), where the balloon enables the antenna to function more effectively.

The deployable antenna may be used with or without the above-described power generation from gas. If used with power generation, the gas generated from the substrate serves three purposes, to vary buoyancy, provide power, and deploy a balloon for facilitating wireless communications. Indeed, the communication circuitry that enables the wireless communications may itself be powered at least in part by the fuel cell.

Example reactions of substrate with liquid as described herein may be regarded as "passive" in the sense that they require no application of electrical power to proceed. This does not mean that other functions of the apparatus must also be passive, however. For instance, the apparatus may contain active components, such as powered circuitry, actuators, valves, and the like, which require power to operate. Power may be used to control actuators and/or other components that expose the substrate or portions thereof to liquid. But once the substrate or portion thereof has been exposed to liquid, the reaction that ensues (e.g., hydrolysis) may require no application of power to proceed. Rather, the reaction may be entirely spontaneous.

Particular embodiments will now be described in connection with an apparatus having the form of a submersible sonde. One should appreciate, though, that a sonde is merely one of a wide range of possible apparatus with which the improvements hereof can be practiced. Thus, the description that follows should be regarded merely as an example that illustrates certain principles of the invention but is not intended to be limiting.

Sonde Example:

A conventional submersible sonde includes a housing, a carbon dioxide cartridge containing carbon dioxide under pressure (i.e., compressed $CO_2$), and an electronic controller. The housing keeps the carbon dioxide cartridge and the electronic controller dry, as well as defines a cavity.

During operation, the sonde may be dropped into the ocean or other large body of water where it then sinks and awaits activation. While awaiting activation, the electronic controller may collect certain measurements (e.g., location, temperature, salinity, etc.). Upon receipt of an activation signal from a base station, the electronic controller activates the carbon dioxide cartridge which releases $CO_2$ into the cavity. As a result, the sonde rises to the ocean surface where it transmits the collected measurements to the base station. While the sonde remains at the ocean surface, the sonde may continue to collect and transmit measurements.

There are deficiencies to a conventional sonde which activates a carbon dioxide cartridge containing carbon dioxide under pressure in order to rise to the ocean surface. Along these lines, the conventional sonde is limited to only certain applications. For example, the carbon dioxide cartridge adds weight. Further, the involvement of carbon dioxide cartridges, i.e., $CO_2$ under very high pressure, may impose certain safety concerns and operational risks (e.g., during handling, during deployment, while submerged, etc.).

To address these deficiencies at least in part, certain disclosed embodiments involve mixing a liquid with a gas-generating substrate to provide gas which may be used to change elevation of at least a portion of an apparatus. In particular, mixing the liquid with the gas-generating substrate produces gas which is input into a container for further use. In one example, a water based solution is mixed with aluminum-based material to generate hydrogen gas. Such gas is then used to change buoyancy, inflate a balloon, fuel a power generator, combinations thereof, and so on. Accordingly, there is no need for a carbon dioxide cartridge containing carbon dioxide under pressure and the associated drawbacks. Moreover, if such techniques enable power generation (e.g., to fuel a hydrogen powered electric generator), the overall weight of the apparatus may be reduced (e.g., smaller batteries to provide initial power may be used) thus providing easier deployment, suitability for other applications, etc.

Figure 1:
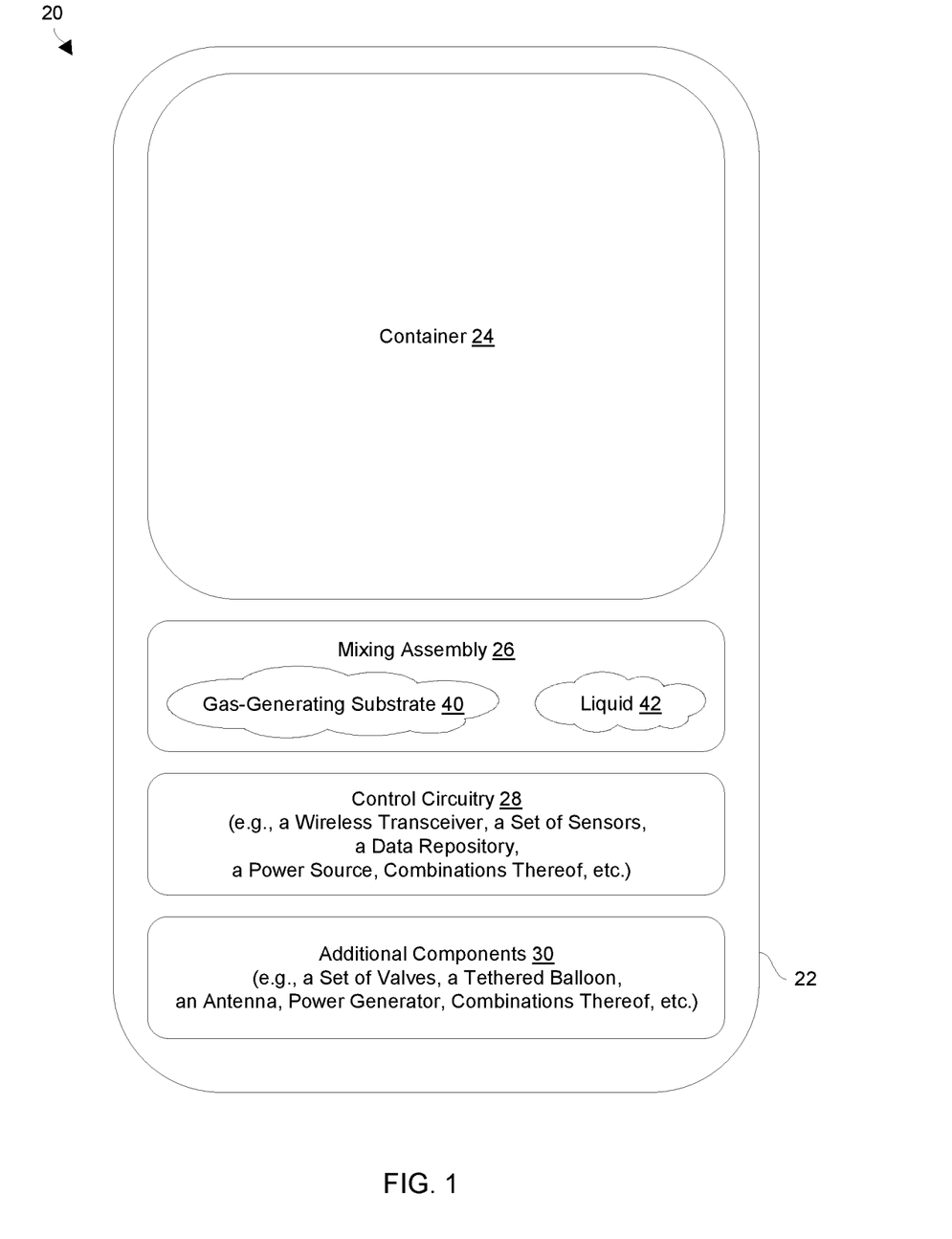
FIG. 1 is a block diagram of an apparatus which provides elevation change in response to mixing a gas-generating substrate with liquid.

FIG. 1 shows an apparatus 20, at least a portion of which is able to change elevation in response to mixing a liquid with a gas generating substrate. The apparatus 20 includes a frame 22, a container 24, a mixing assembly 26, control circuitry 28, and other components 30.

The frame 22 is constructed and arranged to provide support and/or protection to the other componentry of the apparatus 20. In accordance with certain embodiments, the frame 22 has a capsular form factor, which facilitates vertical movement within water. Other shapes may be used, however. The frame 22 acts to shield the mixing assembly 26, the control circuitry 28, etc., from the exterior environmental elements/factors which may include moisture (e.g., seawater, rain, etc.), contamination (e.g., dirt, debris, pests, etc.), pressure, vibration, shock, light, radio/EM emissions, other radiation, and so on.

The container 24 is constructed and arranged to fill with and hold gas for a period of time in order to change buoyancy. As a result, the container 24 (or perhaps the entire apparatus 20) is able to displace water with gas and thus rise from one level or elevation to another. At least a portion of the container 24 may be rigid (e.g., formed of molded plastics, carbon fiber structures, metals, etc.). Furthermore, at least a portion of the container 24 may be flexible (e.g., formed of fabrics, rubber, other elastic materials, etc.).

In some arrangements, the container 24 may be integrated with or formed by a portion of the frame 22. Such arrangements are well suited for applications in which the entire apparatus 22 submerges to a first elevation within a body of water and then rises to a second elevation in response to filling the container 24 with gas.

In other arrangements, the container 24 is mainly separate and distinct from the frame 22. Such arrangements are well suited for applications in which the entire apparatus 22 submerges to a first elevation within a body of water and then, when the container 24 is filled with gas, the container 24 separates from the frame 22 and rises to a second elevation while the frame 22 remains at a lower elevation.

The mixing assembly 26 is constructed and arranged to perform a mixing operation that mixes a gas generating substrate 40 with a liquid 42 to generate gas. In accordance with certain embodiments, the mixing assembly 26 includes a holding portion which stores the gas generating substrate 40 prior to apparatus deployment (e.g., within a substrate holder, sealed in a casing/magazine, etc.). However, the mixing assembly 26 may store the liquid 42 prior to apparatus deployment or access the liquid 42 after apparatus deployment (e.g., by opening a valve to introduce seawater, rain, etc.).

The control circuitry 28 is constructed and arranged to communicate with equipment that is external to the apparatus 20, as well as perform electronic operations. To this end, the control circuitry 28 may include a wireless transceiver, a set of sensors, a data repository, a power source, combinations thereof, etc. Moreover, in accordance with certain embodiments, the control circuitry 28 controls the operation of the mixing assembly 26 and, in some examples, other componentry of the apparatus 20 (e.g., valves, etc.).

The other components 30 represent other parts of the apparatus 22 such as a set of valves, a tethered balloon, an antenna, a power generator, combinations thereof, and so on. Such other componentry 30 may depend on the particular application or mission of the apparatus 22. Along these lines, the apparatus 22 may hold, as a payload, cameras and other detection devices if on a surveillance mission. Furthermore, the apparatus 22 may hold, as a payload, explosives or other munitions if on a military mission. Other applications are suitable as well (e.g., food, supplies, data communications devices to form a network, a set of propellers for propulsion/navigation, and so on).

During operation, the apparatus 20 is deployed in a field environment. For example, the apparatus 20 may be dropped from the air, perhaps among a group of similar apparatus 20, into a body of water, onto a difficult to reach land area, etc. Once the apparatus 20 reaches the field, the control circuitry 28 may begin to monitor the environment and await commands from remote equipment (while moving with water currents, while being exposed to the weather, etc.).

Upon receipt of a change elevation command from the remote equipment (or a change elevation command that was pre-programmed), the control circuitry 28 provides a mixing signal to the mixing assembly 26. In response, the mixing assembly 26 performs a mixing operation that mixes the gas generating substrate 40 with the liquid 42 to generate gas and to input the generated gas into the container 24. As a result, the buoyancy of the container 24 changes, thus enabling the elevation of the container 24 to change (e.g., rise from a first submerged elevation to surface if deployed in a body of water, rise above a physical obstructions if deployed on land or sea to improve line of sight, and so on).

In some arrangements, the apparatus 20 is equipped to repeat this operation multiple times without further direct access (e.g., without further provisioning, without reloading, etc.). In some arrangements, the operation of the apparatus 20 is pre-programmed into the apparatus 20 by the remote equipment prior to deployment.

In some arrangements, a set of pre-programmed commands is loaded into the control circuitry prior to deployment. One of these pre-programmed commands may be the change elevation command thus alleviating the need to provide the change elevation command remotely. The control circuitry then executes the pre-programmed change elevation command, perhaps in accordance with a pre-defined schedule. Other pre-programmed commands may include instructions to perform tests, carry out communications, and so on. Such pre-programmed commands may take the form of one or more executable applications, command scripts, scheduled routines, combinations thereof, and so on. Further details will now be provided with reference to FIG. 2.

Figure 2:
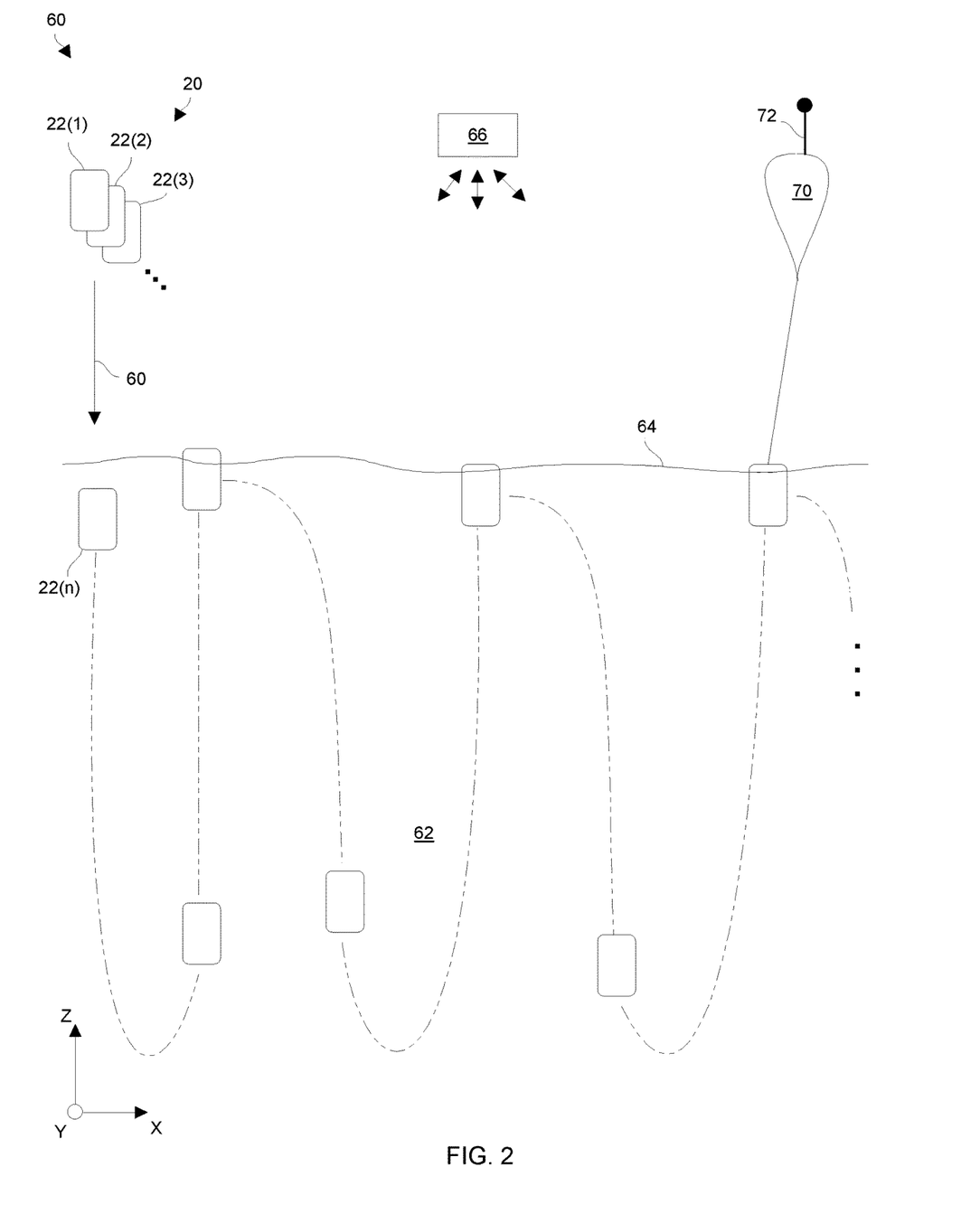
FIG. 2 is a diagram illustrating how a set of apparatus may operating in an environment.

FIG. 2 shows deployment of a set of apparatus 20(1), 20(2), 20(3), . . . . (collectively, apparatus 20) into an environment 60. By way of example, the main portion 62 of the environment 60 is a large water mass such as an ocean or sea. Each apparatus 20 (e.g., the apparatus 20(n)) may be deployed into the main portion 62 of the environment 60 (e.g., dropped in the negative Z-direction) from a vehicle such as a boat, an airplane, a submarine, and so on. In the context of a large water mass, once an apparatus 20 enters the water, the apparatus 20 may submerge beneath the surface 64 as well as travel with currents, tides, wind, etc. to different longitudes and/or latitudes (e.g., change in the X and Y directions).

As shown in FIG. 2, upon placement of the apparatus 20(n) into the water, the apparatus 20(n) initially submerges to a low elevation due to low buoyancy. The other apparatus 20 may be deployed in a similar manner either at the same initial location (e.g., as a group) or individually in a distributed manner (e.g., over a wide area).

In some arrangements, the container 24 of each apparatus 20 may initially fill with water (e.g., through an open valve or venting area). During such submersion, the control circuitry 28 may monitor the depth of that apparatus 20 and stop filling the container 24 with water once that apparatus 20 reaches a certain depth (e.g., a predefined depth).

Unlike a conventional device which may be weighted down with additional ballast that could undesirably anchor that device to a fixed spot, each apparatus 20 has the ability to achieve an equilibrium before reaching the bottom (e.g., by controlling filling of the container 24). As a result, the apparatus 20 may move (e.g., drift) within the water mass 62 to different locations over time.

After each apparatus 20 has been deployed for a period of time (e.g., an hour, a day, a week, a month, a year, etc.), remote equipment 66 may transmit a change elevation command to effectuate an elevation change for that apparatus 20. The remote equipment 66 and the apparatus 20 may employ security measures to prevent hacking, unauthorized accessing, interference, etc. during such activity. Such remote equipment 66 may include a variety of different types of control circuits such as a base station at a fixed ground location, a controller on a boat, specialized equipment on an aircraft, different devices connected in a network, client/server equipment, combinations thereof, etc.

In some arrangements, the remote equipment 66 transmits a single change elevation command and all of the apparatus 20 respond to that same change elevation command. Such arrangements enable the remote equipment 66 to reach all apparatus 20 with a single transmission (e.g., one broadcast).

In other arrangements, the remote equipment 66 transmits a respective change elevation command to a particular targeted apparatus 20 and only that targeted apparatus 20 responds to that change elevation command (e.g., the other apparatus 20 disregard that change elevation command). Such arrangements enable the remote equipment 66 to selectively change elevation of each apparatus 20 individually for increased flexibility.

Alternatively, if the mission for the apparatus 20 has been pre-programmed into the apparatus 20 prior to deployment, the apparatus 20 may itself trigger a change elevation operation upon a particular event. For example, the apparatus 20 may detect that it has reached a particular target position via GPS circuitry.

By way of example, the container 24 of the apparatus 20 is integrated with the frame 22 (also see FIG. 1). Accordingly, the entire apparatus 20 changes elevation in response to changes in buoyancy. However, in other arrangements, the container 24 is allowed to separate from the frame 22 (e.g., via a tube that operates as a gas conduit) so that mainly the container 24 changes elevation. In some arrangements, the container 24, when changing elevation, causes the frame 22 also to change elevation, e.g., by pulling the frame 22 upwards.

As further shown in FIG. 2, the apparatus 20 (e.g., the apparatus 20(n)) may change elevation multiple times. That is, the apparatus 20 may submerge below the surface 64 and rise back to the surface 64 repetitively during the course of operation. In some arrangements, the apparatus 20 submerges in response to a first change elevation command (e.g., a submerge command) and rises to the surface in response to a second change elevation command (e.g., a surface command), re-submerges in response to a third change elevation command, and so on.

It should be understood that each apparatus 20 may perform other operations while submerged and/or at the surface 64 such as operate sensors to obtain measurements from the environment 60, log the measurements based on GPS location/timestamps/etc., release items into the environment 60, transmit information, communicate with other apparatus 20, and so on. By way of example only, the apparatus 20(*n*) is shown as filling a tethered balloon 70 with gas and releasing the tethered balloon 70 which carries an antenna 72 which is coupled with the control circuitry 28 (also see the additional components 30 in FIG. 1). Such a scenario is well suited for a series or array of apparatus 20 distributed across a wide area to improve line of site communications between apparatus 20 and/or the remote equipment 64 (e.g., to form a communications fabric within the environment 60). Further details will now be provided with reference to FIGS. 3 and 4.

Figure 3:
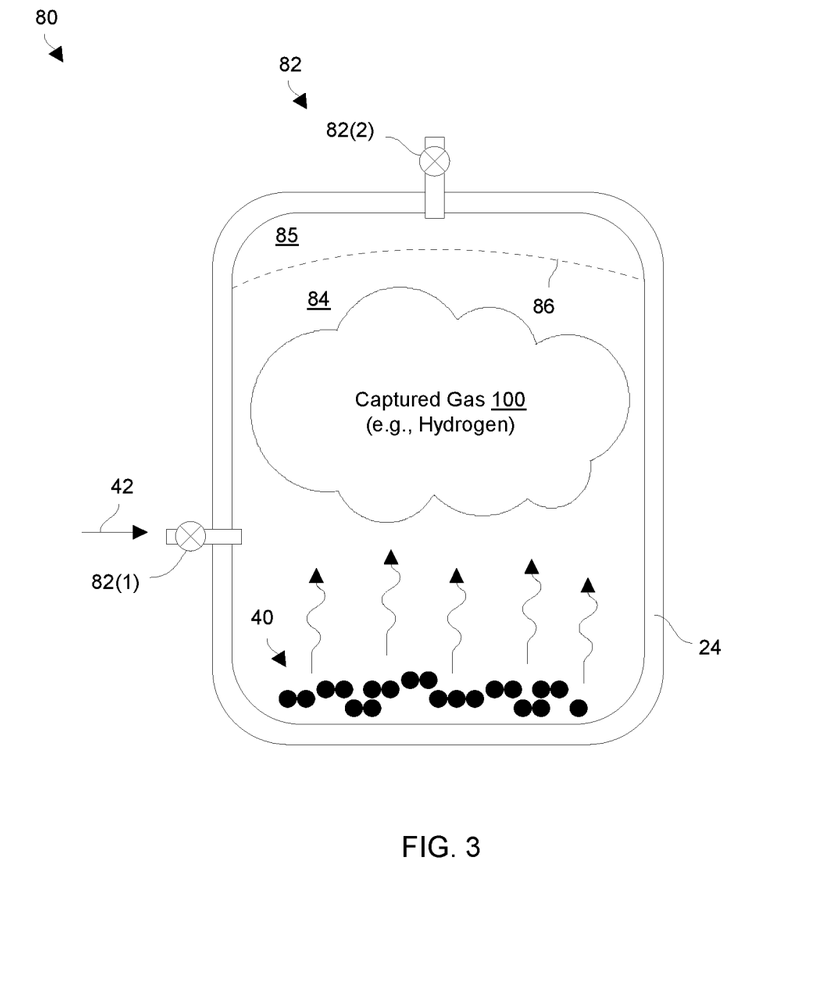
FIG. 3 is a block diagram of particular details of the apparatus of FIG. 1 in accordance with certain embodiments.
Figure 4:
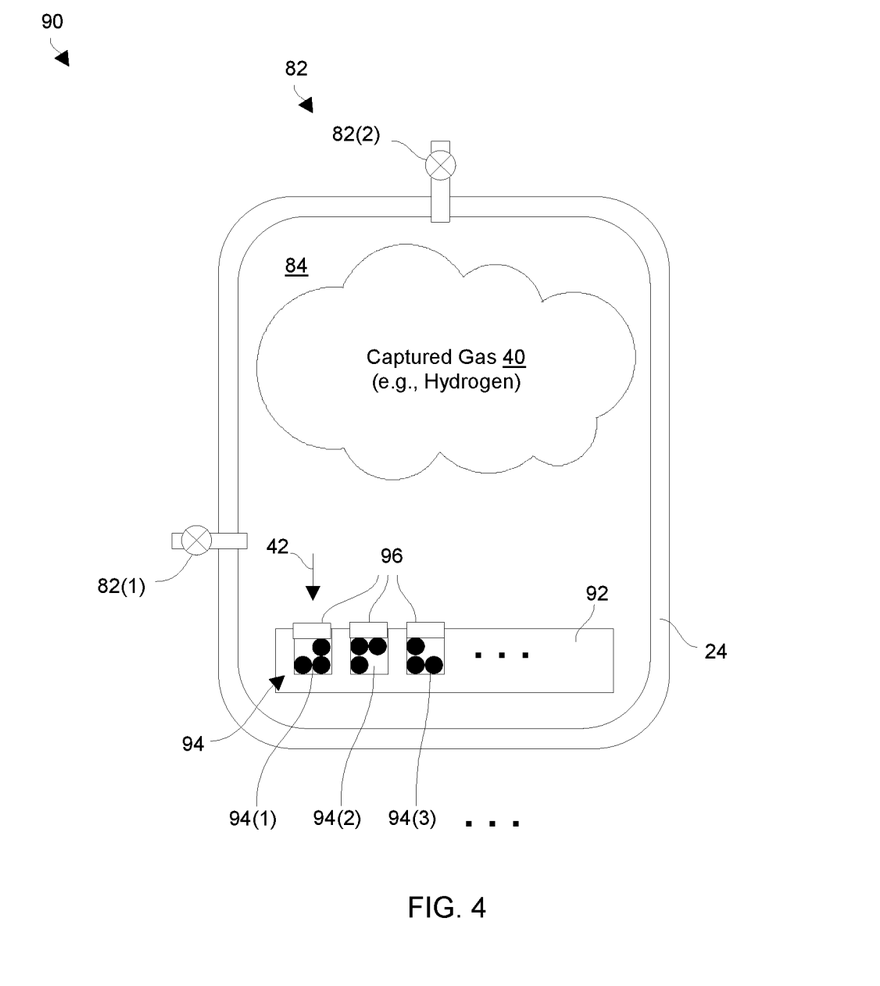
FIG. 4 is a block diagram of particular details of the apparatus of FIG. 1 in accordance with other embodiments.

FIGS. 3 and 4 show additional example details of the apparatus 20. FIG. 3 shows a simple arrangement 80 for mixing the gas-generating material 40 with liquid 42 to generate gas 100. Similarly, FIG. 4 shows another arrangement 90 for mixing the gas generating material 40 with liquid 42 to generate gas 100. One should appreciate that the liquid 42 exposed to the gas-generating material 40 may be the same in this example as the fluid which surrounds the apparatus 20.

By way of example only, both arrangements 80 and 90 utilize as the gas generating material 40, an aluminum-based material that generates hydrogen gas ($H_2$) when mixed with a liquid 42 that includes water (e.g., a water-based solution). It should be understood that the aluminum-based material produces the hydrogen gas even if impurities exist within the liquid 42. Accordingly, a variety of readily accessible sources exist for the liquid 42 (e.g., seawater, waste water, rain, etc.).

With attention now to FIG. 3, the arrangement 80 shows that the gas generating material 40 resides within a designated area of the container 24. The mixing assembly 26 (also see FIG. 1) includes a set of valves 82 (or mixers) that operate to mix the liquid 42 with the gas generating material 40. By way of example, a flexible membrane 86 (e.g., a balloon, bellows, bladder, etc.) may be used to separate interior spaces 84 and 85 of the container 24, with space 84 initially kept dry and space 85 initially filled with liquid 42. Liquid 42 does not reach the gas generating material 40 until valve 82(1) or a similar fluid control device is opened.

In response to a mixing signal from the control circuitry 28 of the apparatus 20, valve 82(1) of the mixing assembly 26 opens to enable liquid 42 to mix with the gas generating material 40. Valve 82(2) may also be opened at this time to allow liquid to escape. For example, as gas is created membrane 86 may expand, displacing liquid from the space 85 through open valve 82(2). Other mixing alternatives are suitable for use as well as long as the mixing assembly 26 does not mix the gas generating material 40 with the liquid 42 until the control circuitry 28 provides the mixing signal (also see FIG. 1).

As liquid 42 continues mixing with the gas generating material 40 to generate the gas 100, the gas 100 continues to displace liquid 42 back into the environment 60, e.g., through the opened valve 82(2). Accordingly, the buoyancy of the container 24 increases, thus providing a desired change in elevation.

In some arrangements, the mixing assembly 26 closes one or more of the set of valves to capture the gas 100. As a result, the gas 100 collects within the container 24. Other mechanisms are suitable for use as well such as check valves designed to open and allow flow in one direction at a particular predefined pressure.

With attention now to FIG. 4, the arrangement 90 is similar to the arrangement 80 in that the mixing assembly 26 includes a set of valves (or mixers) 82 to control movement of liquid 42 into and out of the interior 84 of the container 24. The arrangement 90 further includes a substrate holder (or carrier) 92 having individual mixing chambers (or cells) 94(1), 94(2), 94(3), . . . (collectively, mixing chambers 94) containing respective portions of the gas generating material 40. Each mixing chamber 94 has a temporary seal 96 which at least temporarily protects the gas generating material 40 within that mixing chamber 94 from mixing with liquid 42 when the liquid is within the container 24.

During operation, suppose that the apparatus 20 is currently submerged within a body of water and that one or more valves 82 have been opened to allow water to flow into the interior 84 of the container 24. At this point, the apparatus 20 may be at a first elevation within the body of water (also see FIG. 2) due to the container 24 holding liquid 42 and reaching equilibrium.

At some point, the control circuitry 28 of the apparatus 20 receives a change elevation command from the remote equipment 66 (FIG. 2) (or the change elevation command was pre-programmed) and provides a mixing signal to the mixing assembly 26 to enable the mixing assembly 26 to perform a mixing operation. The mixing assembly 26 responds by opening a set of temporary seals 96 to expose the gas generating material 40 residing within a respective set of mixing chambers 94. Accordingly, the liquid 42 within the container 24 mixes gas generating material 40 within opened mixing chambers 94 to produce gas 100 which fills the interior 84 of the container 24.

In some arrangements, the temporary seals 94 are wax or film coatings that may be melted away in response to electric current or other heating mechanisms (e.g., similar to burning away portions of a fuse). In other arrangements, the temporary seals 94 are spring loaded shutters that pop open upon actuation. Other mechanisms are suitable for use as well (e.g., puncturing membranes, servos/actuators, chemical reactions to dissolve the seals 96, etc.). Many mechanisms have been contemplated, and the particular ones described are intended to be examples rather than limiting.

One or more valves 82 remain open to enable the liquid 42 to be displaced from the interior 84 of the container back into the environment 60 as the gas is input into the container 24. As a result, the buoyancy of the container 24 changes and the apparatus 20 rises (FIG. 2). Eventually, the apparatus 20 reaches the surface 64 where further operations may take place (e.g., transmission of data, deployment of a balloon, etc.).

At the end of the mission, the set of valves 82 may be re-opened to allow liquid 42 to re-fill the container 24 (e.g., in response to a second change elevation command). Accordingly, the apparatus 20 re-submerges (FIG. 2).

Once the apparatus 20 has re-submerged to a particular target elevation below the surface 64, the set of valves 82 may be controlled to maintain that elevation. At this point, the apparatus 20 is again ready to respond to another change elevation command by opening another set of temporary seals 96 to expose the gas generating material 40 residing within another set of mixing chambers 94 as described above for further re surfacing and re-submerging events, and so on.

Figure 5:
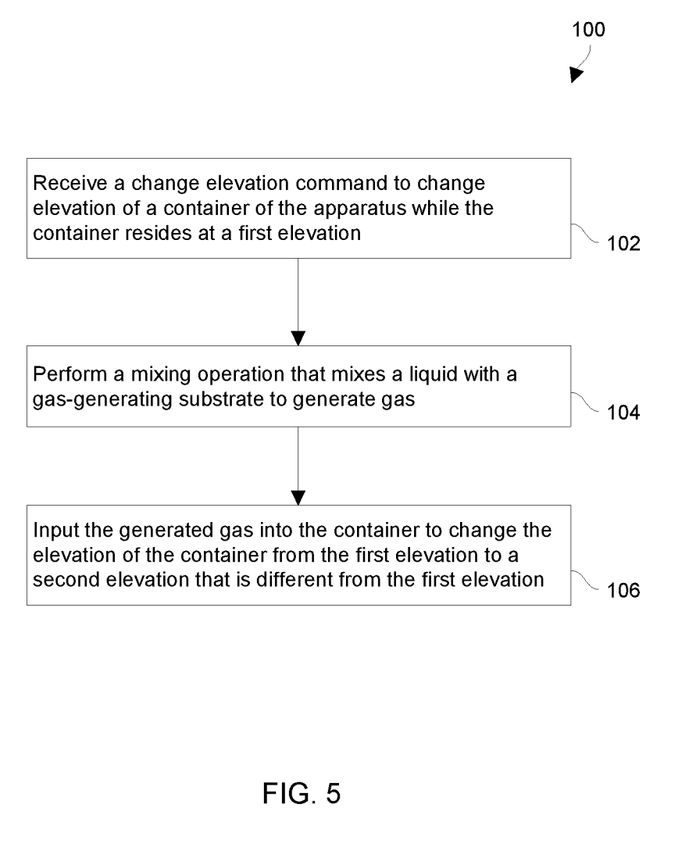
FIG. 5 is a flowchart of a procedure which is performed an apparatus to change elevation of at least a portion of the apparatus in response to mixing a liquid with a gas generating substrate.

FIG. 5 is a flowchart of a procedure 100 which is performed by an apparatus when changing elevation of at least a portion of the apparatus. The procedure 100 may be repeated for the apparatus. Additionally, the procedure 100 may be performed in a coordinated manner with other apparatus in response to the same commands.

At 102, the apparatus receives a change elevation command to change elevation of a container of the apparatus while the container resides at a first elevation. As mentioned earlier, the change elevation command may originate from remote equipment (e.g., see FIG. 2). In other arrangements, the change elevation command may be pre-programmed into the apparatus and the apparatus simply executes a predefined plan of operation.

At 104, the apparatus, in response to the change elevation command, performs a mixing operation that mixes a liquid with a gas generating substrate to generate gas. As mentioned earlier, the gas that is produced may be hydrogen gas which changes the buoyancy of the container. Such hydrogen may be used for other purposes as well such as fueling a hydrogen generator to provide electric power to perform further operations.

At 106, the apparatus inputs the generated gas into the container to change elevation of the container from the first elevation to a second elevation that is different from the first elevation. In configurations in which the mixing assembly is at least partly integrated with the container (also see FIGS. 3 and 4), the apparatus may allow the gas to freely accumulate within the interior of the container and the entire apparatus may change elevation. In configurations in which the mixing assembly and the container are separated, the provided gas may be fed from mixing assembly through a tube (or channel) into the container so mainly the container changes elevation while the other portions of the apparatus remain submerged at a lower elevation.

Figure 6:
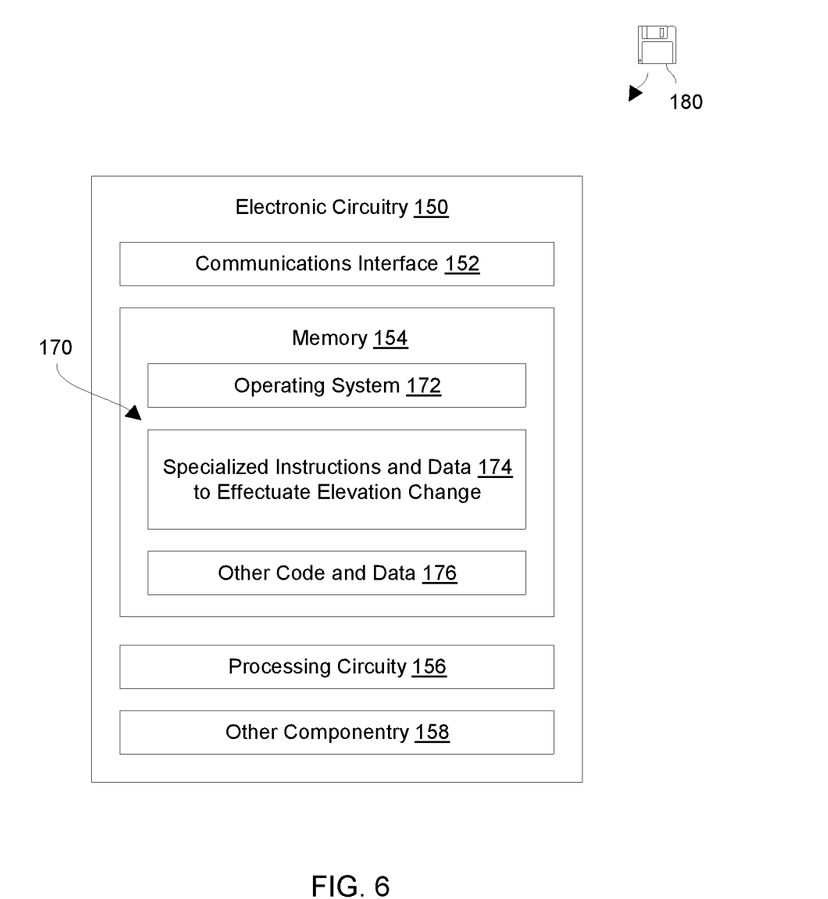
FIG. 6 is a block diagram of electronic circuitry details of the apparatus of FIG. 1.

FIG. 6 shows electronic circuitry 150 which is suitable for use to effectuate elevation change. Along these lines, the electronic circuitry 150 may form at least a portion of the mixing assembly 26 and/or control circuitry 28 (also see FIG. 1). The electronic circuitry 150 includes a communications interface 152, memory 154, and processing circuitry 156, and other componentry 158.

The communications interface 152 is constructed and arranged to connect the electronic circuitry 150 to other devices to enable external communications. Such communications may be wireless, cable based, fiber-optic based, combinations thereof, and so on. Accordingly, the communications interface 152 enables the electronic circuitry 150 to robustly and reliably communicate with other external devices (e.g., other apparatus 20, remote equipment 66, etc.).

The memory 154 is intended to represent both volatile storage (e.g., DRAM, SRAM, etc.) and non-volatile storage (e.g., flash memory, magnetic memory, etc.). The memory 154 stores a variety of software constructs 170 including an operating system 172, specialized instructions and data 174, and other code and data 176. The operating system 172 refers to particular control code such as a kernel to manage computerized resources (e.g., processor cycles, memory space, etc.), drivers (e.g., an I/O stack), and so on. The specialized instructions and data 174 refers to code that enables electronic circuitry 150 to effectuate elevation change. In some arrangements, the specialized instructions and data 174 is tightly integrated with or part of the operating system 172 itself. The other code and data 176 refers to applications and routines to provide additional operations and services (e.g., sensor operation, measurement logging, location tracking, information relaying, etc.), user-level applications, administrative tools, utilities, and so on.

It should be understood that, in accordance with certain embodiments, the other code and data 176 may include a repository (or log) of measurements received from one or more apparatus 20. Such a repository may store such data permanently (i.e., indefinitely) or temporarily (e.g., buffered for a few days, a week, a month, etc.), and so on. Moreover, such data may be relayed by the apparatus 20 to other external devices (e.g., other apparatus 20, a base station, etc.).

The processing circuitry 156 is constructed and arranged to operate in accordance with the various software constructs 170 stored in the memory 154. The processing circuitry 156 executes at least some of the specialized instructions and data 174 to form specialized circuitry which manages operation of the apparatus 20.

Such processing circuitry 156 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 180 is capable of delivering all or portions of the software constructs 170 to the electronic circuitry 150. In particular, the computer program product 180 has a non-transitory (or nonvolatile) computer readable medium which stores a set of instructions which controls one or more operations of the electronic circuitry 150. Examples of suitable computer readable storage media include tangible articles of manufacture and apparatus which store instructions in a nonvolatile manner such as CD ROM, flash memory, disk memory, tape memory, and the like.

The other componentry 158 refers to other components of the apparatus 20. Along these lines, the electronic circuitry 150 may include sensors, antenna, power sources, power generators, and so on.

As described above, a disclosed technique is directed to mixing a liquid 42 with a gas-generating substrate 40 to provide gas 100 which may be used to change elevation of at least a portion of an apparatus 20. In particular, mixing the liquid 42 with the gas generating substrate 40 produces gas 100 which is input into a container 24 for further use. In one example, a water based solution is mixed with aluminum-based material to generate hydrogen gas. Such gas is then used to change buoyancy, inflate a balloon, fuel a power generator, combinations thereof, and so on. Accordingly, there is no need for a conventional carbon dioxide cartridge containing carbon dioxide under pressure and the associated drawbacks. Moreover, if such a technique enables power generation (e.g., to fuel a hydrogen powered electric generator), the overall weight of the apparatus 20 may be reduced (e.g., smaller batteries to provide initial power may be used) thus providing easier deployment, suitability for other applications, etc.

Figure 7:
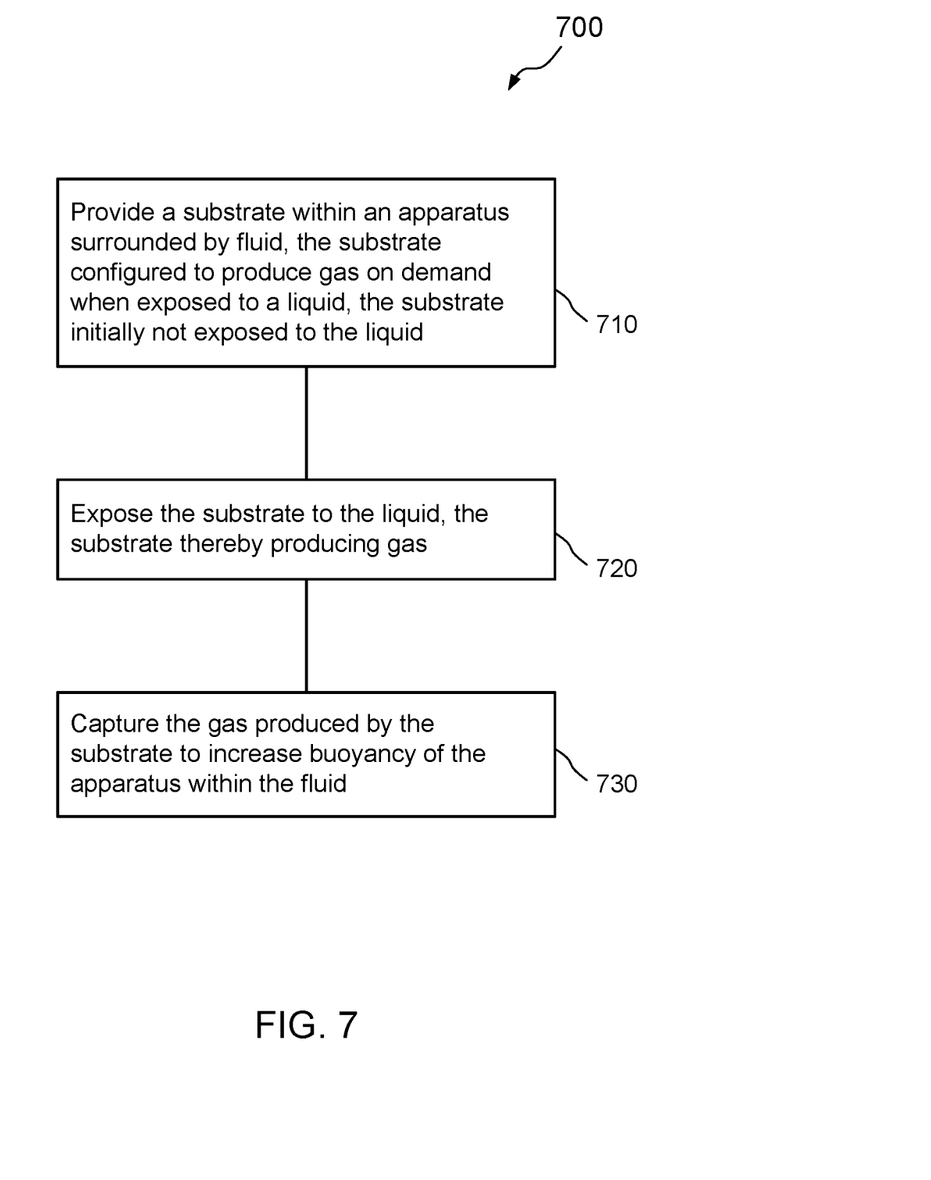
FIG. 7 is a flowchart showing an example method of varying buoyancy of an apparatus.

Review of General Approach:

FIG. 7 shows an example method 700 that may be carried out in connection with an apparatus and provides a summary of the some of the general principles that have been presented above. The method 700 is typically performed, for example, by an apparatus (e.g., apparatus 20) in an environment (e.g., environment 60) in which the apparatus is disposed within a fluid, such as air or water. The various acts of method 700 may be ordered in any suitable way. Accordingly, embodiments may be constructed in which acts are performed in orders different from that illustrated, which may include performing some acts simultaneously.

At 710, a substrate is provided within an apparatus surrounded by fluid. The substrate is configured to produce gas on demand when exposed to a liquid. For example, the substrate may include aluminum that produces hydrogen gas when exposed to water. The substrate initially is not exposed to the liquid. For example, substrate 40 is contained within the apparatus 20, e.g., in a sealed compartment (FIG. 3), or in multiple sealed compartments that may be individually controlled to open (FIG. 4). The sealed compartment(s) keep the substrate dry. The apparatus 20 may be surrounded by fluid, such as a portion 62 of water.

At 720, the substrate is exposed to the liquid and thereby produces gas. For example, water is introduced into container 24, contacting the substrate 40. If multiple compartments are provided (FIG. 4), a desired number of such compartments are opened, exposing the substrate 40 or portions thereof to water. The substrate 40 reacts with the water to produce gas, such as hydrogen gas.

At 730, the gas produced by the substrate is captured to increase buoyancy of the apparatus within the fluid. For example, container 24 captures and contains the gas, e.g., using a balloon, bellows, or bladder, which displaces water and replaces it with gas, increasing the overall buoyancy of the apparatus 20 and tending to cause the apparatus 20 to rise within the water. In some examples, the gas may also be used to inflate a deployable balloon, which may ascend out of the water and into the air.

An improved technique has been described for varying buoyancy of an apparatus. The technique includes providing a substrate configured to produce gas on demand when exposed to a liquid, exposing the substrate to such liquid, and capturing the gas produced by the substrate to increase the buoyancy of the apparatus within a fluid.

Having described certain embodiments, numerous alternative embodiments or variations can be made. For example, embodiments have been described in connection with a sonde capable of multiple cycles of ascending and descending. These are merely examples, however. Other embodiments may be provided for single use, such as for lifting a sonde or other object from the floor of a body of water, or for lifting an object from a deeper level of water to a shallower level. For instance, a person may swim down a structure, attach a device to the structure, and pull a tab that initiates exposure of substrate within the device to liquid. The subsequent generation of gas leading to displacement of fluid creates a force to change elevation of the structure. Some embodiments may be used for recovery of objects or vessels from the sea floor. Also, embodiments may be used for air rather than for water, or for use in both air and water.

Further, although features have been shown and described with reference to particular embodiments hereof, such features may be included and hereby are included in any of the disclosed embodiments and their variants. Thus, it is understood that features disclosed in connection with any embodiment are included in any other embodiment.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should not be interpreted as meaning "based exclusively on" but rather "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of varying buoyancy of an apparatus surrounded by fluid, comprising:
   providing a substrate within the apparatus, the substrate configured to produce gas on demand when exposed to a liquid, the substrate initially not exposed to the liquid;
   exposing the substrate to the liquid, the substrate thereby producing gas; and
   capturing the gas produced by the substrate to increase buoyancy of the apparatus within the fluid,
   wherein, prior to exposing the substrate to the liquid, the apparatus contains a volume of fluid, wherein both the liquid and the fluid are composed at least in part of liquid water, and wherein the method further comprises displacing at least some of the volume of fluid out of the apparatus when capturing the gas such that the apparatus becomes more buoyant and rises within the fluid.

2. The method of claim 1, further comprising:
   generating power using the gas produced by the substrate; and
   operating the apparatus using the generated power.

3. The method of claim 2, further comprising conducting at least a portion of the gas to a balloon, such that the balloon becomes inflated with the gas.

4. The method of claim 3, wherein the balloon is coupled to an antenna, and wherein the method further comprises deploying the balloon on a tether that connects the balloon to the apparatus, enabling the apparatus to send and/or receive wireless communication signals via the antenna.

5. The method of claim 4, further comprising powering the apparatus to send and/or receive the wireless communication signals using the power generated from the gas produced by the substrate.

6. The method of claim 1, wherein the substrate includes a nanogalvanic structured aluminum particulate material.

7. The method of claim 6, wherein both the liquid and the fluid are composed primarily of liquid water.

8. The method of claim 7,
   wherein the apparatus includes a flexible membrane that separates that apparatus into a first portion that contains the substrate and a second portion that contains the volume of fluid, the second portion having a valve that connects the second portion to an environment around the apparatus, and
   wherein displacing said at least some of the volume of fluid within the apparatus includes, upon producing the gas, opening the valve and enabling the flexible membrane to expand, such that said at least some of the volume of fluid exits the apparatus through the valve.

9. The method of claim 1, wherein exposing the substrate to the liquid causes a passive, unpowered hydrolysis reaction that releases hydrogen gas without requiring an application of electrical power.

10. The method of claim 9,
wherein the substrate is composed at least partially of aluminum;
wherein the liquid is composed at least partially of water, and
wherein exposing the aluminum to the water causes the passive, unpowered hydrolysis reaction spontaneously to occur.

11. The method of claim 1, wherein the liquid and the fluid both contain water.

12. The method of claim 1, wherein exposing the substrate to the liquid includes at least one of (i) metering an amount of the substrate exposed to the liquid and (ii) metering an amount of the liquid exposed to the substrate.

13. A method of varying buoyancy of an apparatus surrounded by fluid composed primarily of liquid water, comprising:
providing a substrate within the apparatus, the substrate configured to produce gas on demand when exposed to the liquid water, the substrate initially not exposed to the liquid water;
exposing the substrate to the liquid water, the substrate thereby producing gas; and
capturing the gas produced by the substrate to increase buoyancy of the apparatus within the fluid,
wherein, prior to exposing the substrate to the liquid water, the apparatus contains a volume of fluid, and wherein the method further comprises displacing at least some of the volume of fluid out of the apparatus when capturing the gas such that the apparatus becomes more buoyant and rises within the fluid.

14. The method of claim 13, wherein the substrate includes a nanogalvanic structured aluminum particulate material.

15. The method of claim 14 wherein, prior to exposing the substrate to the liquid water, the apparatus contains a volume of liquid water, and wherein the method further comprises displacing at least some of the volume of liquid water within the apparatus when capturing the gas.

16. The method of claim 15,
wherein the apparatus includes a flexible membrane that separates that apparatus into a first portion that contains the substrate and a second portion that contains the volume of liquid water, the second portion having a valve that connects the second portion to an environment around the apparatus, and
wherein displacing said at least some of the volume of liquid water within the apparatus includes, upon producing the gas, opening the valve and enabling the flexible membrane to expand, such that said at least some of the volume of liquid water exits the apparatus through the valve.

* * * * *